United States Patent [19]
Paluch

[11] 3,831,128

[45] Aug. 20, 1974

[54] ROTATABLE TERMINAL BLOCK

[75] Inventor: Edward S. Paluch, Elmwood Park, Ill.

[73] Assignee: Reliable Electric Company, Franklin Park, Ill.

[22] Filed: July 23, 1973

[21] Appl. No.: 381,785

[52] U.S. Cl. .................. 339/18 B, 174/60, 317/118

[51] Int. Cl. .............................................. H01r 9/02

[58] Field of Search ....... 339/18, 198, 75, 176, 273, 339/274, 125, 36, 44; 317/117–122; 174/59, 60

[56] References Cited

UNITED STATES PATENTS

| | | | |
|---|---|---|---|
| 3,004,235 | 10/1961 | Cohen | 339/18 B |
| 3,166,369 | 1/1965 | Trump | 339/18 B |
| 3,170,746 | 2/1965 | Asku | 339/18 B |
| 3,323,095 | 5/1967 | Bush et al. | 339/18 B |
| 3,418,621 | 12/1968 | Campbell, Jr. | 339/18 B |
| 3,784,728 | 1/1974 | De Bortoli et al. | 339/18 B X |

*Primary Examiner*—Bobby R. Gay
*Assistant Examiner*—Terrell P. Lewis
*Attorney, Agent, or Firm*—Olson, Trexler, Wolters, Bushnell & Fosse, Ltd.

[57] ABSTRACT

A rotatable terminal block for communications circuits has a group of terminals with front and rear portions projecting respectively from opposite faces of the block. The block is mounted on a bracket that is in turn adapted to be mounted on a main distribution frame. The block is rotatably mounted on the bracket for movement between two positions in order present alternatively the front or rear portions of the terminals for the purpose of affixing wire conductors. Lock levers are provided that cooperate with trunions on the block for releasably locking the block in each of the two positions. A cover is pivotably mounted on the block and is rotatably therewith. Latch plates on the cover hold the cover over the terminals, the latch plates being releasable to permit exposure of the front portions of the terminals for attachment of wires thereto.

6 Claims, 5 Drawing Figures

ROTATABLE TERMINAL BLOCK

BACKGROUND OF THE INVENTION

This invention relates to improvements in terminal blocks of the type that are used on main distribution frames that form part of the equipment in telephone switching systems.

Main distribution frames are utilized to provide a flexible connecting point between subscribers' distribution cables and switching equipment. These main distribution frames also provide a convenient point for testing both outside plant and central office equipment, as well as protection of each cable pair so as to prevent large potentials from damaging central office equipment.

In general, the terminal blocks used on main distribution frames have a number of terminals therein which project outwardly from opposite sides of the opposed faces of the block so that conductors can be connected to opposite ends of the terminals. The front ends of the terminals are generally accessible to service personnel, whereas the rear ends of the terminals are often obstructed to some extent. This factor increases the time required to make connections to rear ends of the terminals.

OBJECTS AND SUMMARY OF THE INVENTION

An object of this invention is to provide a terminal block which is rotatably mounted so as to enable installers or like service personnel to obtain access to both the front and rear end of the terminals from a frontal position.

A further object of this invention is to provide a rotatable terminal block of the type stated which reduces the amount of time necessary to effect termination of conductor wires at both ends of the terminals.

A still further object of this invention is to provide a rotatable terminal block of the type stated which may be used with terminals of various types, for example wire-wrap posts, solder tabs, crimp and push-on wire terminators, etc.

In accordance with the foregoing objects, the invention provides a rotatable terminal block assembly comprising a block having opposed front and rear faces and a surrounding peripheral edge. The peripheral edge includes a top and bottom edge portions in addition to side edge portions. A block frame structure is provided which has sections at the aforesaid side edge, top and bottom edge portions. The frame sections at the side edge portions include trunions. The block has a plurality of terminals projecting beyond its opposite faces and providing front and rear portions having means for connections to conductor wires. The top edge portion of the block has a fanning strip that projects beyond the opposite faces of the block. The assembly further includes a bracket having a slotted back for receiving the wires, and spaced apart legs for rotatably supporting the trunions to permit rotational movement of the block between two positions. One of the positions is a position in which the front face of the block and the front portions of the terminals are presented away from the bracket back (i.e., facing forwardly) and the other position is a position in which the rear face of the block and the rear portions of the terminals face forwardly. Lock lever means are provided on the legs for releasably locking the block in either of said two positions whereby locking action may be selective in each position, thereby holding the block fixed in each position and enabling wires to be connected to the terminals. A cover is pivotably mounted on the block frame and spans the space between the legs. The cover is disposed in front of the front terminal portions when the block is in the first-mentioned position. Means are provided for releasably locking the cover to the legs of the bracket so that release of the cover permits the cover to swing downwardly for access to the front terminal portions.

DETAILED DESCRIPTION

Figures 1, 2:
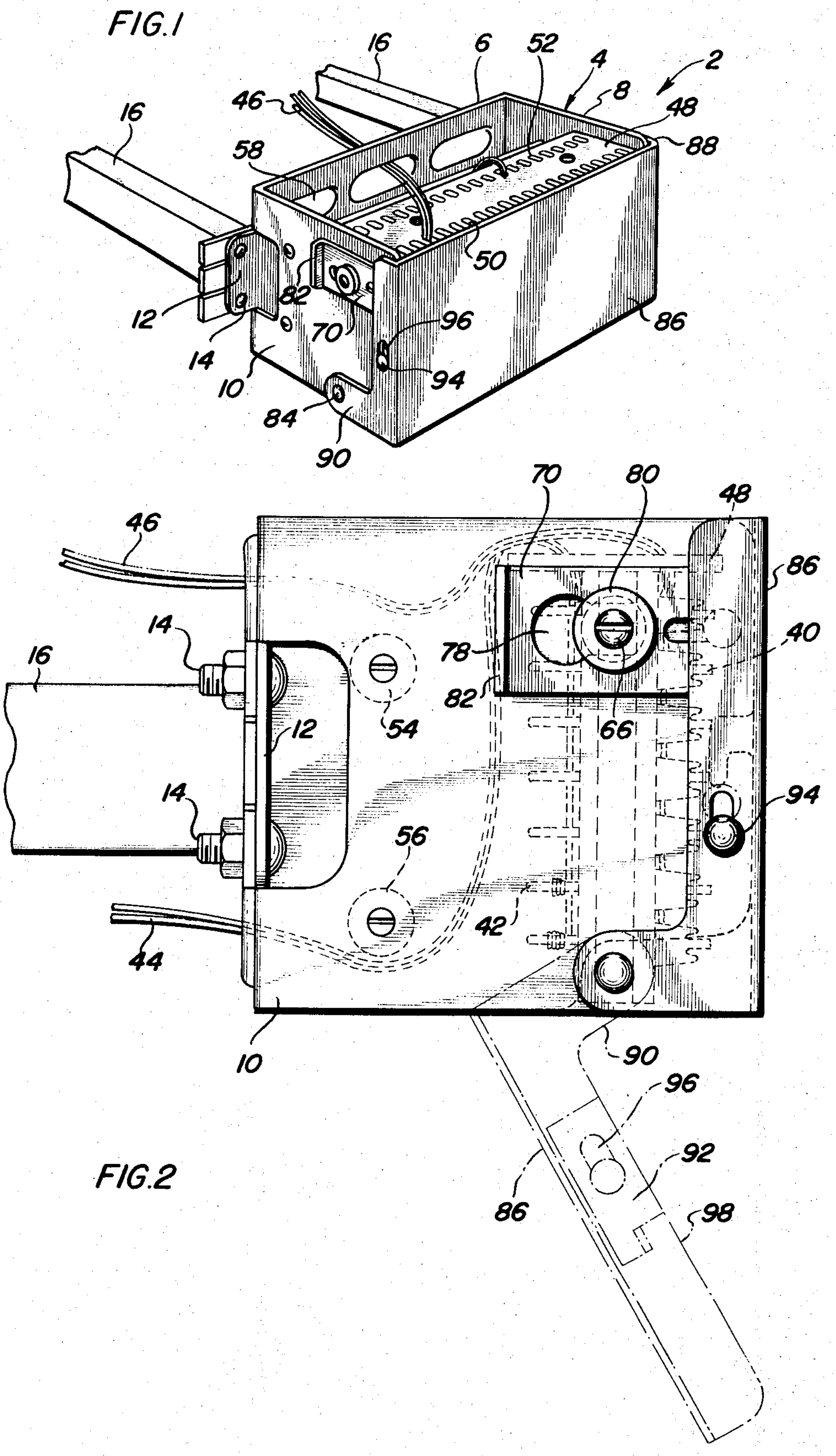
FIG. 1 is a perspective view of a terminal block assembly constructed in accordance with an embodying present invention and shown mounted on a main distribution frame.
FIG. 2 is a side elevational view on an enlarged scale, of the terminal block assembly of FIG. 1 and showing the terminal block in the normal position of operation.

Referring now in more detail to the drawing, which illustrates a preferred embodiement of the present invention, there is shown a terminal block assembly 2 comprising a U-shaped bracket 4 having a back 6 and spaced parallel legs 8, 10. Struck outwardly from the legs 8, 10 adjacent to the back 6 are ears 12, 12 for receiving bolt and nut assemblies 14, 14 and by which the assembly 2 is secured to frame member 16, 16 of a main distribution frame or the like. For purposes herein the main distribution frame is shown fragmentarily.

Figure 3:
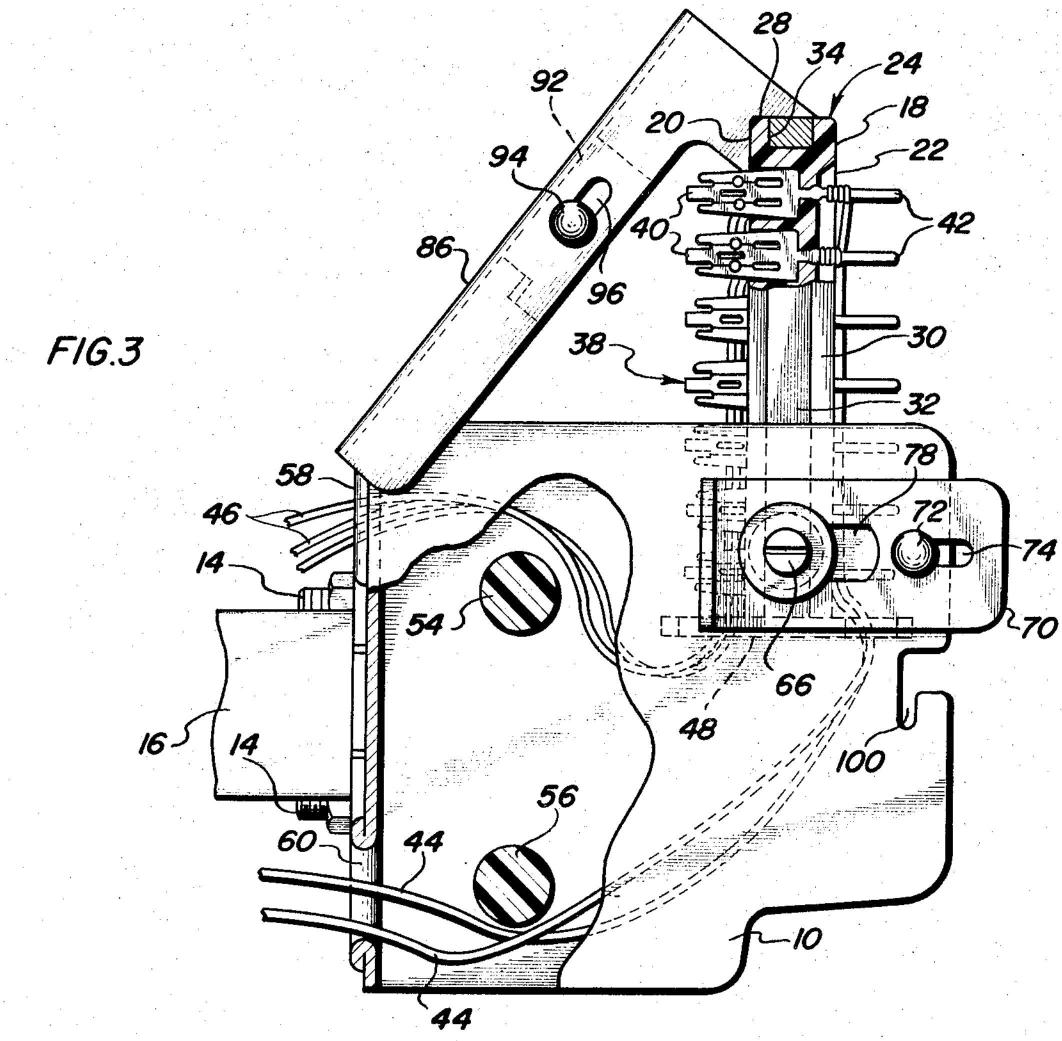
FIG. 3 is a side elevational view, similar to FIG. 2 but partially broken away and in section, and further showing the terminal block rotated 180° from the position shown in FIG. 2 for access to the rear terminal portions of the terminals in the block.
Figure 4:
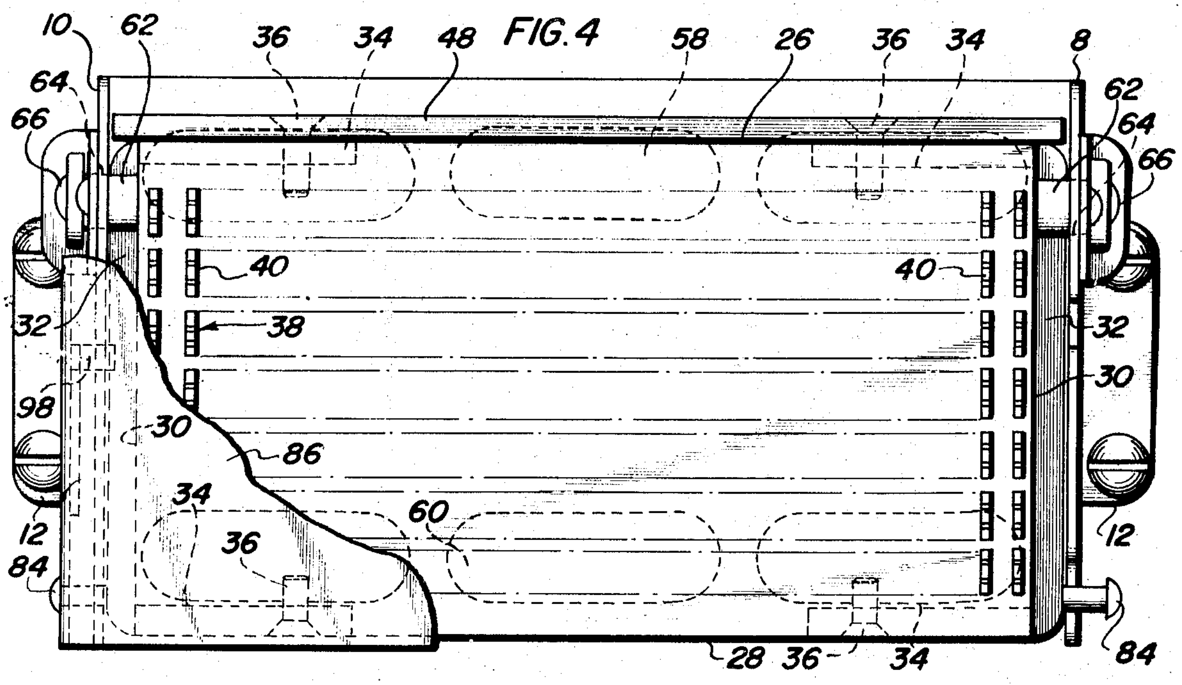
FIG. 4 is a front elevational view of the assembly but with the cover being partially broken away.

The terminal block assembly also includes a terminal block 18 of generally rectangular configuation and preferably of a suitable dielectric material. This block 18 has front end rear faces 20, 22 and a peripheral edge 24. The peripheral edge 24 comprises a top edge portion 26, a bottom edge portion 28, and side edge portions 30, 30. Secured to the peripheral edge 24 is a block frame structure, preferably of metal, and comprising a pair of U-shaped frame section 32, 32 which are disposed at the top edge portions 26, 28 and also at the side edge portions 30, 30. As best seen in FIG. 3 and 4, the top and bottom edge portion 26, 28 are formed with grooves 34, 34 that receive the leg portions of the U-shaped sections 32, 32. The leg portions of the U-shaped sections 32, 32 are secured to the block 18 by screws 36 (FIG. 4).

Mounted in the block 18 is a series of metal terminals 38 at which conductor wires can be attached or terminated. As shown in the present embodiment, there are a number of rows and columns of terminals, but it will be understood that the array of terminals may be of any desired configuration. Each terminal 38 is permanently anchored in the block 18 and includes a front portion 40 that projects forwardly of the front face 20 and a rear portion 42 that projects rearwardly of the rear face 22. The terminal 38 may be of any known type and need not be limited to the configuration herein shown. However, as shown herein for purposes of example, the terminal 38 may be of the type disclosed in U.S. Pat. No. 3,605,071 that issued September 14, 1971. Accordingly, the rear portions 42 of the terminals 38 are used for wire wrap terminations of conductors 44 while the front portions 40 are used as dual clip connections for terminating the conductors 46. It will also be apparent that the block 18 need not be dielectric. In such case each terminal 38 will be surrounded by or otherwise electrically insulated from the other terminals.

Provided on the top edge 26 is a dielectric fanning strip 48 that may be secured in any suitable manner to the block as by the screws 36. The fanning strip 48 projects outwardly beyond the opposed front and rear faces 20, 22 and includes two rows of holes 50, 52 through which the conductor 44, 46 extend. More particularly, the conductors 44 are routed through the holes 52 whereas the conductors 46 are routed through the holes 50. Joined to and extending between the bracket legs 8, 10 are upper and lower wire guides 54, 56 which may be of a suitable plastic material and which serve to guide or route the bundles of wires 44, 46, as best seen in FIGS. 2 and 3. It will also be noted that at the bracket back 6 is formed with upper and lower sets of slots 58, 60 which respectively receive the bundles of wires 46, 44 for convenient distribution thereof onto the main distribution frame.

Figure 5:
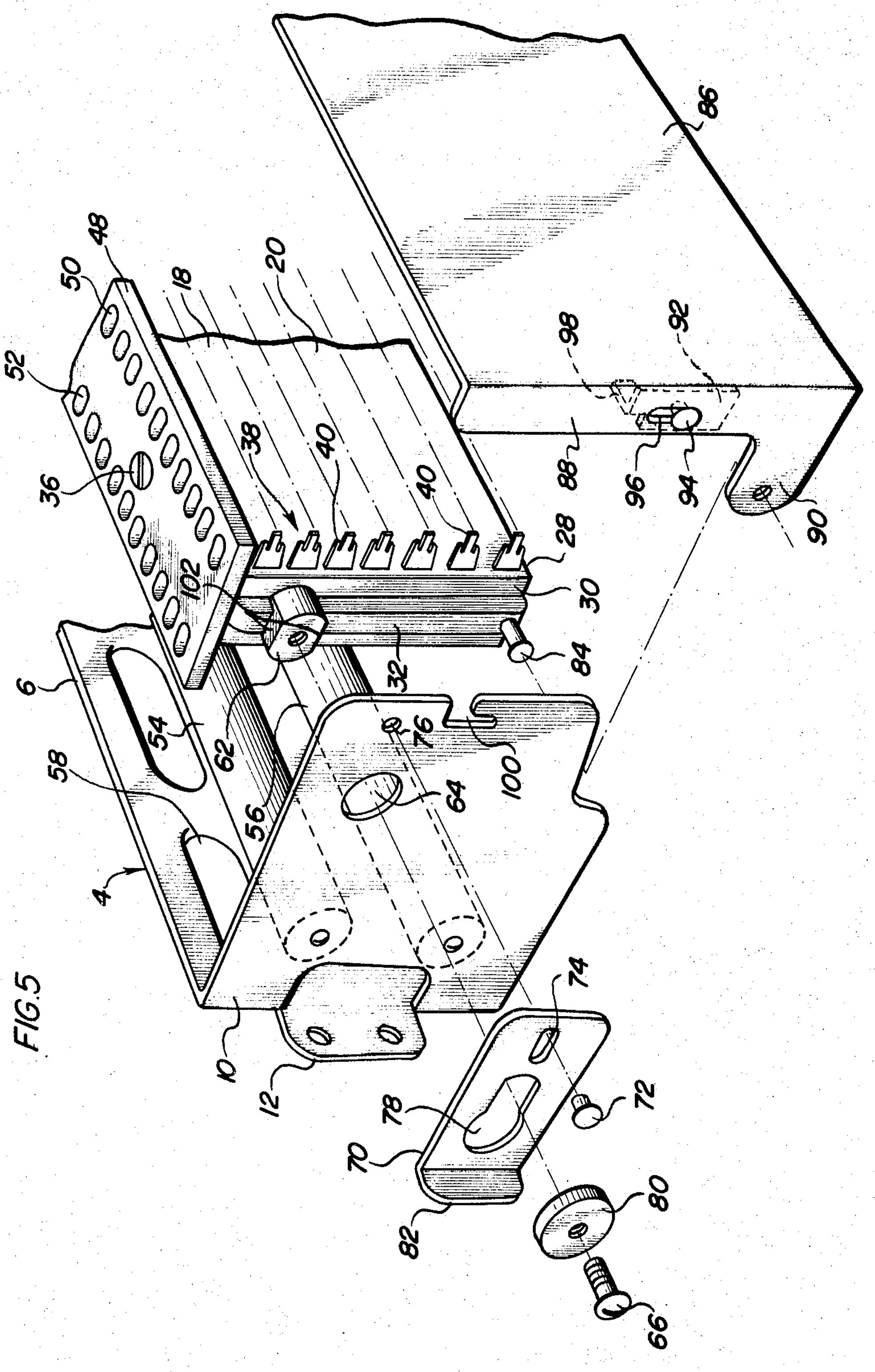
FIG. 5 is a fragmentary exploded perspective view of the terminal block assembly as seen from one corner thereof.

Provided on the U-shaped sections 32, 32 adjacent to the fanning strip 48 and top edge portion 26 are trunions 62, 62 which are adapted to project rotatably through holes 64, 64 (FIGS. 4 and 5) in the bracket legs 8, 10. The trunions 62, 62 are diametrally slotted to receive the sections 32, 32 and are retained in place on the block frame sections 32, 32 by screws 66 that thread into the respective sections 32, 32. The legs 8, 10 are also provided on their exterior sides with slideable lock levers 70, 70 which are slideably retained on the legs by pins 72, 72, the latter projecting through elongated slots 74 in the lock levers and being secured at holes 76 (FIG. 5) near the forward edges of the legs 8, 10, as best seen in FIG. 5. Furthermore, the lock levers 70, 70 are formed with keyhole slots 78 which receive the trunions 62. Disposed on the outside of each lever 70 is a washer 80 that is retained by the screw 66, the washer 80 being of larger diameter than the large or circular part of the keyhole slot 78. For convenience in manipulating the lock lever, a lateral finger tab 82 is provided at the rear end thereof.

Pivotally mounted on the block frame sections 32, 32 by means of pivot pins 84, 84 is a sheet metal cover 86. The pivot pins 84, 84 are spaced substantially from the trunions 62, 62 and are located adjacent to the bottom edge portion 28 of the block 18. Furthermore, the cover 86 includes inwardly turned marginal flanges 88, 88 which are adapted to fit along the exterior surfaces of the bracket 8, 10 at the forward portions thereof. Each flange 88 includes a lower extension 90 which receives the pivot pin 84 to provide the pivotal mounting of the flange 88 on the block frame section 32.

The cover 86 may be retained in its closed position by latch plates 92, 92 on the interior surfaces of the respective flanges 88. Each latch plate 92 rigidly carries a headed pin 94 that projects through an elongated slot 96 in the flange 88. Each latch plate 92 also includes a laterally presented locking projection 98 that is adapted to fit into a locking slot 100 in the forward edge of the bracket leg 8 or 10, as the case may be. Thus, when the cover 86 is in the closed position, as shown in FIG. 1 and in full lines in FIG. 2, the locking projections 98 of the respective latch plates 90 seat in the locking slots 100 in the respective bracket legs 8, 10.

When it is desired to perform some work on the front portions 40 of the terminals, it is merely necessary to grasp the pins 94 and lift upwardly on the latch plates 92 until the locking projections 98 are aligned with the upper openings of the locking slots 100. The cover 86 can then be swung downwardly about the common axis of the pivot pins 94 and assume the position shown in broken lines in FIG. 2. The cover may be reclosed by swinging it upwardly with the latch plates 92 lifted until the locking projection 98 are shifted into the locking slots 100 after which the latch plates are allowed to drop downwardly and lock the cover in place.

If access is desired to the rear portions 42 of the terminals 38 the cover is first opened in the manner heretofore stated. At this time the opposed flats 102 (FIG. 5) of the trunions 62 are in the narrower parts of the keyhole slots 78 whereby the block 18 is non-rotatable or locked in the position shown in FIG. 2. Thereafter, the lock levers 70 are pulled forwardly so that the trunions 62 are in the larger portion of the keyhole slots 78 after which the block 16 may be rotated 180° from the position shown in FIG. 2 to the position shown in FIG. 3. This now places the rear portions 42 of the terminals in a forward direction so that direct and unobstructed access may be had thereto for removing or replacing conductor wires or for other servicing purposes. The cover 86 is rotatable with the block 18 but rests in a position against the bracket 4 and out of the way of the front portions 40 of the terminals. Furthermore, the block 18 may be locked in a position shown in FIG. 3 by simply moving the lock levers 70, 70 rearwardly to their original positions to bring the flats 102, 102 of the trunions into the narrower parts of the keyhole slots 78. The block 18 is returned to the position shown in FIG. 2 by simply shifting the lock levers 70, 70 again forwardly to bring the larger parts of the keyhole slots around the trunions 62, 62 so that the block 18 and cover 86 may be rotated back to the position shown in FIG. 2 (the cover being in the position shown in broken lines) following which the cover is reclosed and relatched.

The invention is claimed as follows:

1. A rotatable terminal block assembly comprising a block having opposed front and rear faces and a surrounding peripheral edge, said peripheral edge including top and bottom edge portions, and side edge portions, means at said peripheral edge forming a block frame, said block frame having sections at said side edge portions and at said top and bottom edge portions, the sections at said side edge portions including trunions, a plurality of terminals in said block electrically isolated from each other, said terminals projecting beyond both of said opposed faces and providing front and rear terminal portions having means for connections to conductor wires, a fanning strip on said top edge portion and projecting beyond said opposed faces and having means for routing conductor wires, a bracket having a slotted back and spaced apart legs, means for mounting said bracket on a main distribution frame, said trunions projecting through said legs and being rotatably supported thereby for permitting rotational movement of the block between two positions, one of said positions being a position in which the front face of said block and the front portions of said terminals presented away from said bracket back, the other of said positions being a position in which said rear face of the block and the portions of said terminals are presented away from said bracket back, lock lever means on said legs for releasably locking said block in either of said two positions, a cover pivotally mounted on said block frame and spanning the space between said legs, said cover being disposed in front of the front terminal portions when the block is in said one position, and means for releasably locking the cover to said legs so that release of the cover permits the cover to swing downwardly for access to said front terminal portions, said cover being rotatable with said block when the cover is released.

2. A rotatable terminal block according to claim 1 in which said trunions have flats that are engaged by said lock lever means in each of said two positions.

3. A rotatable terminal block according to claim 1 in which said means for releasably locking the cover to said legs comprises latch plates slideable on said cover and engageable with pins on said legs.

4. A rotatable terminal block according to claim 1 in which said bracket has conductor-wire guides extending between said legs and in spaced apart relation.

5. A rotatable terminal block according to claim 4 in which said fanning strip has two rows of spaced apart holes constituting said means for routing the conductor wires, the spacing of the rows being at least as great as the distance between said opposed faces.

6. A rotatable terminal block according to claim 1 in which said block has grooves at said top and bottom edge portions, and said block frame is within said grooves.

* * * * *